United States Patent [19]
Wolfe

[11] 3,867,781
[45] Feb. 25, 1975

[54] TROLLING FEATHER

[76] Inventor: Henry S. Wolfe, Beaver Hill Bldg. (South), Jenkintown, Pa. 19046

[22] Filed: Jan. 18, 1973

[21] Appl. No.: 324,565

[52] U.S. Cl............. 43/42.09, 43/42.05, 43/42.28, 43/42.36, 43/42.39
[51] Int. Cl............................................. A01k 85/00
[58] Field of Search............. 43/42.09, 42.05, 42.36, 43/42.28, 42.39

[56] References Cited
UNITED STATES PATENTS

| | | | |
|---|---|---|---|
| 1,454,820 | 5/1923 | Readle | 43/42.05 |
| 1,688,110 | 10/1928 | Bogart | 43/42.05 |
| 2,036,954 | 4/1936 | Murray | 43/42.36 X |
| 2,419,037 | 4/1947 | Safford | 43/42.05 |
| 2,950,560 | 8/1960 | Worden | 43/42.36 X |
| 3,078,611 | 2/1963 | Nishioka | 43/42.05 |

Primary Examiner—Russell R. Kinsey
Assistant Examiner—Daniel J. Leach
Attorney, Agent, or Firm—Karl L. Spivak, Esq.

[57] ABSTRACT

An interchangeable trolling feather comprising generally a separate weighted head having an axial bore which overfits and receives a head stop. The head stop is slidable on and is retained upon a beaded chain or wire which rearwardly carries a fishing hook. Feathers are tied to the head stop in a manner to cover and hide the hook when the device is fully assembled.

8 Claims, 6 Drawing Figures

PATENTED FEB 25 1975 3,867,781
SHEET 1 OF 2
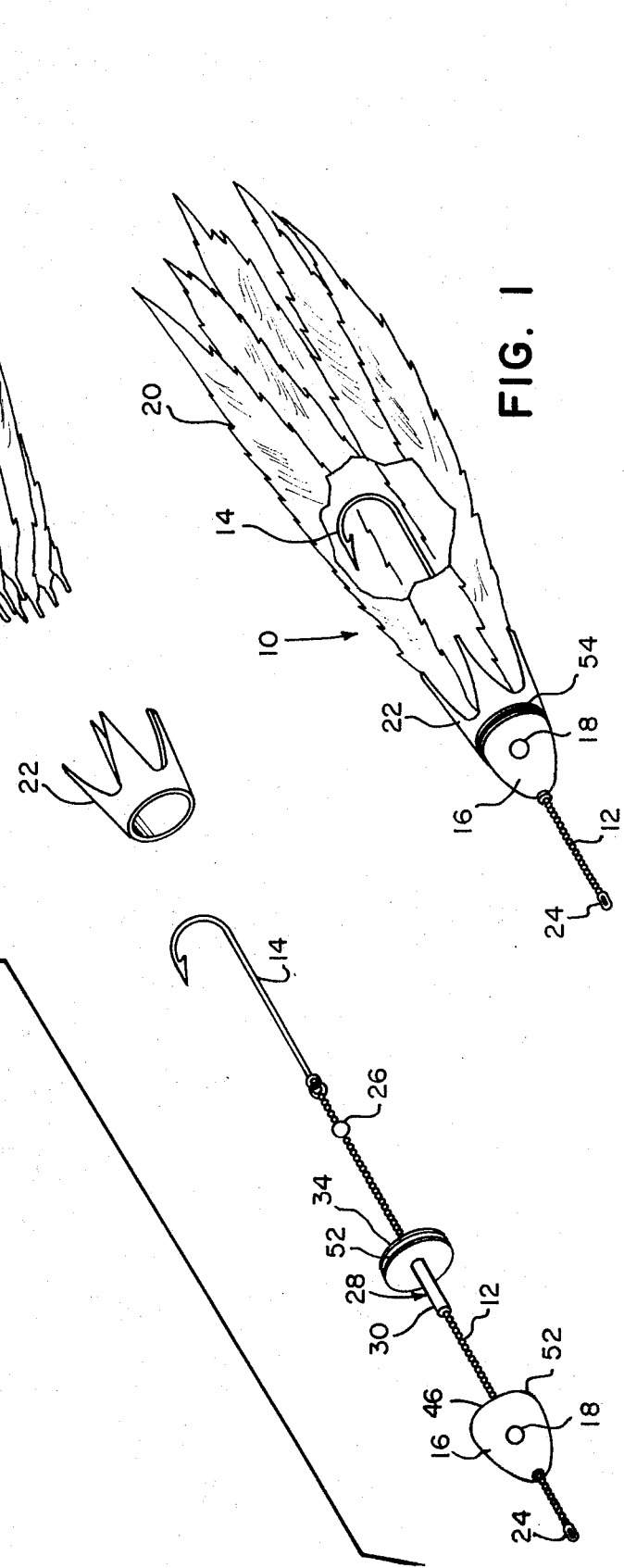
FIG. 1
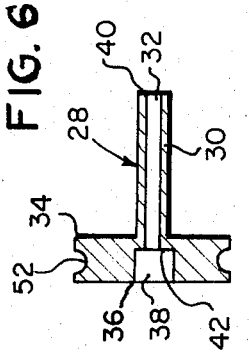
FIG. 2
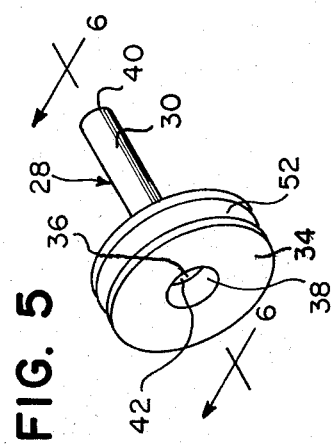
FIG. 5
FIG. 6

TROLLING FEATHER

BACKGROUND OF THE INVENTION

The present invention relates generally to the field of fishing equipment, and more particularly, is directed to a trolling feather.

In order to practice the sport of deep sea fishing by trolling, prior workers in the art have developed trolling feathers which are manufactured to simulate a live fish and to hide the fishing hook. The prior art devices usually consist of a lead head which is chrome plated and has two colored glass inserts to simulate the eyes of a fish. The front end of the head is provided with a connecting ring to connect the device to the fishing line and the rear of the device carries a conventional attached hook for catching the fish. A plurality of feathers affix to the trailing edge of the head and are tied thereto in a secure manner to permit the feathers to trail rearwardly to obscure the fishing hook. Usually, the connection of the feathers to the head is additionally provided with a vinyl or natural skin cover in a manner to make the device appear more natural to the fish.

The prior art devices have generally proven satisfactory in use but have certain inherent disadvantages in that the presently commercially available trolling feathers are all of solid, non-interchangeable construction. Thus, when it is desired to change either the size of the hook or the type or color of the feathers, in accordance with present practice, an entirely different trolling feather assembly has to be substituted. Because of this, a serious fisherman now has to carry a multitude of various size trolling feathers and many trolling feathers of a single size but having different colored feather constructions. Such present practice is both costly and cumbersome when considering the shear weight of all of the required trolling feather modifications.

SUMMARY OF THE INVENTION

The present invention relates generally to the field of fishing trolling feathers, and more particularly, is directed to a trolling feather construction wherein the head is readily interchangeable with the hook.

The present invention includes a fishing hook which is connected to a length of flexible beaded chain or to a conventional wire. A large bead or other stop is interposed in the chain or wire between the connection to the fishing line and the hook. The large bead or stop serves as a rearward catch for a head stop which incorporates a stem having an axial bore of size to overfit the beaded chain or wire but not the large bead. The head stop slides relative to the beaded chain or wire and includes an integral flange which serves as a rearward seat for a lead head. The associated lead head is internally provided with an axial bore of a size to overfit and receive the head stop stem therein. Thus, when a head of desired size is associated with the head stop, the large bead or stop serves to rearwardly retain the head in a set position relative to the fishing hook. A plurality of decoratively colored feathers affix to the flange of the head stop and trail rearwardly to fully cover the hook so that the hook cannot be seen by the fish. Interchangeable heads of different weights can be employed with a single beaded chain or wire, and hook and head stop construction. Various feather color combinations can be associated with different head stops to thereby provide an easy, quick and inexpensive method of changing the appearance of the trolling feather.

It is contemplated that the head stops of the present invention will be inexpensively formed of plastic or die-cast metal and that different colored feathers with skirts will be affixed to different head stops. In this manner, the color of the trolling feather can be quickly and cheaply interchanged. A fisherman, by employing this invention, can now carry four or five different weight lead heads, perhaps 10 or 20 different size hooks and, for example, up to 50 different colors of feathers by simply purchasing relatively inexpensive head stops with the differently colored feathers attached. Thus, a fisherman can now secure a full complement of trolling feathers without going to the expense or being encumbered with the weight and bulk which would be necessitated by carrying an equal variety of presently available, integral trolling feathers.

It will now be possible to purchase the feathers and skirts tied to the head stop at far less cost than would be required to purchase a complete lure with the chrome plated head attached. A fisherman can now not only quickly interchange colors of feathers, but also can interchange sizes of heads by simply sliding on a larger head in association with the head stop and hook.

It is therefore an object of the present invention to provide an improved trolling feather of the type set forth.

It is a further object of the present invention to provide a novel trolling feather of separate construction whereby the head may be readily separated from the hook and head stop for feather changing purposes.

It is another object of the present invention to provide a novel trolling feather which comprises a hook and beaded chain or wire, a head stop slidable on the beaded chain or wire, a rearward catch for the head stop and a lead head provided with internal construction to receive the head stop whereby the hook, the head stop and the head stop and the head are all readily interchangeable.

It is another object of the present invention to provide a novel trolling feather which incorporates means to readily interchange hook sizes, head sizes and feather colors.

It is another object of the present invention to provide a novel trolling feather which incorporates construction to provide a completely flexible situation whereby a fisherman can adjust his tackle to meet various fishing needs with the least amount of equipment and in the least possible period of time.

It is another object of the present invention to provide a novel trolling feather which includes head stop means removably associated with a hook and connecting leader, the head stop means having variously colored feathers attached whereby a differently colored trolling feather can be readily assembled.

It is another object of the present invention to provide a novel trolling feather that is simple in design, rugged in construction and trouble-free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

BRIEF DESCRIPTION OF THE DRAWINGS

FIG. 1 is a perspective view of the invention in assembled relation, partially broken away to expose the fishing hook.

FIG. 2 is an exploded perspective view of the device of FIG. 1.

FIG. 5 is an enlarged, perspective view of the head stop.

FIG. 6 is a cross sectional view taken along Line 6—6 of FIG. 5, looking in the direction of the arrows.

DESCRIPTION OF THE PREFERRED EMBODIMENT OF THE INVENTION

Figure 3:
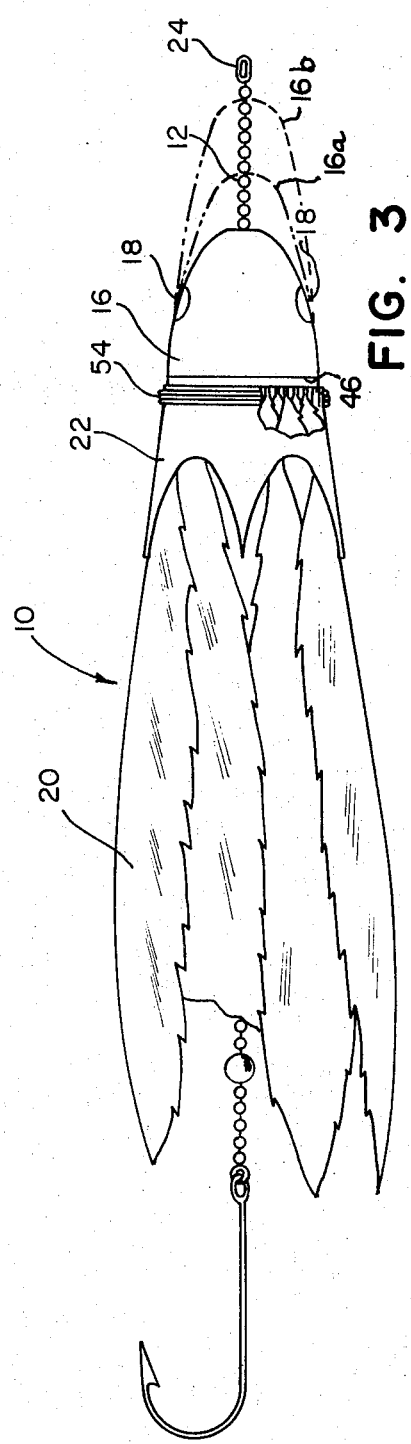
FIG. 3 is a side elevational view of the device in the process of being assembled, portions of which have been broken away to expose details of interior construction.

Although specific terms are used in the following description for the sake of clarity, these terms are intended to refer only to the particular structure of my invention selected for illustration in the drawings, and are not intended to define or limit the scope of the invention.

Referring now to the drawings, I show in FIG. 1 a trolling feather 10 which is fabricated in accordance with the present invention and includes generally, a beaded chain or conventional heavy duty trolling wire connecting means 12 to which is connected a fishing hook 14 of convention design. A head 16 which is preferably fabricated of a weighty, non-corrosive material such as lead, is slidable over the connecting means 12. The head is chrome plated in well-known manner and is equipped with one or more recessed, simulated eyes 18 to give the device the appearance of an actual fish when in use. A head stop 28 is a sliding fit on the connecting means 12 and functions to maintain the head 16 in position in a removable manner. A plurality of feathers 20 are affixed to the periphery of the flange 34 of the head stop 28 by tying in conventional manner. If desired, a vinyl or natural skin cover 22, which is well-known in the art, can also be connected to the periphery of the flange 34 over the connected end of the feathers 20 to further simulate the appearance of a living fish.

Figure 4:
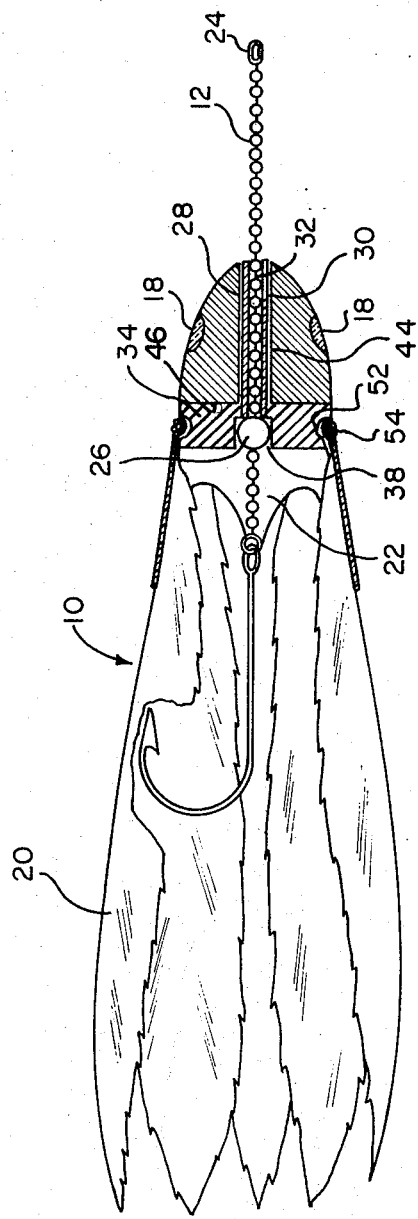
FIG. 4 is a side elevational view of the device similar to FIG. 3, showing the relation of parts in assembled form and partially broken away, and partially in section, to expose details of interior construction.

As best seen in FIGS. 2 and 4, I show the beaded chain or wire connecting means 12 with a conventional fish hook 14 connected at the rearward end thereof and with a ring connector 24 affixed at the leading end thereof for conveniently tying to the fishing line (not shown) in conventional manner. The beaded chain or wire 12 medially carries an affixed enlarged bead stop or rearward catch means 26 which is preferably spherical in configuration and may be fabricated of the same material as the beaded chain itself. Optionally, the rearward catch 26 could be fabricated in the form of a crimped eyelet or similar construction which is larger than the beaded chain or wire 12. The stop 26 is positioned upon the beaded chain or wire 12 in suitable location to receive the head stop 28 and to provide sufficient beaded chain or wire flexibility both forwardly and rearwardly to permit substantially unrestricted movement of the trolling feather 10 through the water (not shown) when in use to simulate the movements of a fish.

The head stop 28 is generally cylindrical in configuration and includes a cylindrical body member 30 which is drilled or otherwise treated to provide a longitudinal bore 32 of size to overfit the beaded chain or wire 12 in a manner to permit the beaded chain or wire to be axially drawn therethrough. The head stop 28 is preferably fabricated of a tough durable plastic such as nylon plastic, or may be conventional diecast metal. The body member 30 terminates rearwardly in an integral flange 34 which serves as a retainer for the head 16 in the manner as hereinafter more fully set forth. A bead socket 36 of generally hollow, cylindrical configuration is integrally, rearwardly formed into the flange 34 and preferably, is concentric therewith. The bead socket 36 defines an interior, rearwardly opening recess 38 for receiving and engaging the large bead stop or crimped eyelet 26 therein. The recess 38 communicates with the longitudinal bore 32 to permit the beaded chain or wire 12 to be readily drawn through the head stop 28. The beaded chain or wire 12 inserts forwardly through the recess 38 and communicating bore 32 and is pulled forwardly through the leading edge 40 of the head stop 28 when assembling the trolling feather 10. It will be noted from the drawings that the flange 34 is oriented in the direction of the hook 14.

The beaded chain or wire 12 may be forwardly urged through the head stop 28 until the bead stop or crimped eyelet 26 fully seats within the recess 38 and bottoms against the trailing end 42 of the body member 30. The beaded chain or wire, terminates forwardly in a ring connector 24 which must be sized to fit within and be slidable through the longitudinal bore 32 prior to tying the fishing line (not shown) to the beaded chain or wire 12.

As best seen in FIGS. 2, 3 and 4, the head 16 is fabricated to simulate an actual fish head and is provided with a longitudinal bore 44 of a size to closely overfit the body member 30 of the head stop 28. The trailing end 46 of the head 16 is fabricated to suitable cross sectional configuration and size to seat upon the flange 34 of the head stop 28. The flange serves as a stop against which the trailing end 46 of the head 16 bottoms as the device 10 is pulled through the water. Thus, it is seen that a head 16 can be rendered readily removable from an associated hook 14 by simply pulling the head 16 forwardly relative to the beaded chain or wire 12 and the head stop 28 until the longitudinal bore 44 of the head 16 clears the forward ring connector 24. A new head of different weight can be relatively easily associated with the hook 14 by feeding the beaded chain or wire 12 and affixed head stop 28 forwardly through the longitudinal bore 44 of the head 16 by pulling the beaded chain or wire 12 through the longitudinal bore 32 until the flange 34 of the head stop 28 bottoms against the trailing end 46 of the head 16.

A plurality of feathers 20 of any desired configuration or color combination can be conventionally affixed to the head stop 28 by tying the forward end of the feathers at the peripheral groove 52 which is machined or otherwise conventionally formed in the flange 34. In accordance with usual practice, a vinyl or other waterproof material cover 22 is similarly affixed to the head stop 28 at the feather connection by utilizing the same tie 54.

By employing the removable beaded chain or wire 12, the associated bead stop or rearward catch 26 and head stop 28, it is thus demonstrated that any desired number and weight of beads 16 may be designed and employed for use with a single fishing hook 14, beaded chain or wire 12 and head stop 28 combination. The head stops as herein employed may be varied within wide parameters as to type of feather, color of feather, etc., as may be necessary or thought desirable by the fisherman as most suitable for given situations. Additionally, various sized hooks with affixed connecting means components can also be provided. The combination of the rearward bead socket 36 provided in each flange 34 of the head stop 28 and the longitudinal bore 44 provided in the head 16 to receive the body member 30 of the head stop 28 serve to render the device readily interchangeable as to various head and hook combinations. Head stops 28 with variously colored feather combinations can be easily assembled to quickly and inexpensively change the appearance of the trolling feather.

As best seen in FIG. 3, the weight of the head may be readily varied relative to the head stop 28 and the hook 14 by applying other heads 16a, 16b of increased size. Each head 16, 16a or 16b should terminate in a trailing end which is identical in cross sectional configuration to the head stop flange 34 so that the head rests flush against the head stop. By designing the trailing end and the flange to the same dimensions, undue turbulence can be eliminated as the device is pulled through the water.

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a trolling feather construction including a hook which is attached to a fishing line for trolling through water, the combination of
   A. flexible means connected to the hook to permit substantially unrestricted movement of the trolling feather through water,
      1. said flexible means haaving a first end and a second end,
      2. said first end affixing to the hook,
      3. said second end affixing to the fishing line;
   B. catch means medially carried by the flexible means to serve as a stop,
      1. said catch means having a cross-sectional configuration which is larger than the cross-sectional configuration of the flexible means;
   C. a weighted head removably associated with the said flexible means,
      1. said head being provided with a first axial bore,
      2. a portion of the flexible means being insertable forwardly into the first axial bore,
      3. the catch means limiting the forward travel of the flexible means relative to the head;
   D. head stop means removably associated with the flexible means to maintain the head in a predetermined position;
      1. said head stop means including a head stop which has a second axial bore,
      2. the said flexible means inserting through the second axial bore,
      3. the said head stop means having axial motion relative to the flexible means,
      4. the head stop including a radially extending flange;
   E. and colored feathers attached to the head stop at the flange thereof,
      1. said colored feathers extending rearwardly and covering the said hook.

2. In a trolling feather construction including a hook which is attached to a fishing line for trolling through water, the combination of
   A. flexible means connected to the hook to permit substantially unrestricted movement of the trolling feather through water,
      1. said flexible means having a first end and a second end,
      2. said first end affixing to the hook,
      3. said second end affixing to the fishing line;
   B. catch means medially carried by the flexible means to serve as a stop,
      1. said catch means having a cross-sectional configuration which is larger than the cross-sectional configuration of the flexible means;
   C. a weighted head removably associated with the flexible means,
      1. said head being provided with a first axial bore,
      2. a portion of the flexible means being insertable into the first axial bore,
      3. the catch means limiting the forward travel of the flexible means relative to the head;
   D. head stop means removably associated with the flexible means to maintain the head in a predetermined position,
      1. said head stop means including a head stop which has a second axial bore,
      2. the said flexible means inserting through the second axial bore,
      3. the said head stop means having axial motion relative to the flexible means,
      4. the head stop means contacting the catch means,
         a. said catch means having larger circumferential dimension than the second axial bore,
      5. the head stop being rearwardly provided with a recess which is sized to receive and engage the catch means,
      6. the head stop including a radially extending flange and a forward portion,
      7. the forward portion of the head stop including a cylindrical body member,
         a. said body member inserting into the first axial bore of the weighted head.

3. In a trolling feather construction including a hook which is attached to a fishing line for trolling through water, the combination of
   A. flexible means connected to the hook to permit substantially unrestricted movement of the trolling feather through water,
      1. said flexible means having a first end and a second end,
      2. said first end affixing to the hook,
      3. said second end affixing to the fishing line;
   B. catch means medially carried by the flexible means to serve as a stop, 1. said catch means having a cross-sectional configuration which is larger than the cross-sectional configuration of the flexible means;
C. a weighted head removably associated with the flexible means,
   1. said head being provided with a first axial bore,
   2. a portion of the flexible means being insertable into the first axial bore,
   3. the catch means limiting the forward travel of the flexible means relative to the head;
D. head stop means removably associated with the flexible means to maintain the head in a predetermined position,
   1. said head stop means including a head stop which has a second axial bore,
   2. the said flexible means inserting through the second axial bore,
   3. the said head stop means having axial motion relative to the flexible means,
   4. the head stop means contacting the catch means,
      a. said catch means having larger circumferential dimension than the second axial bore,
   5. the head stop being rearwardly provided with a recess which is sized to receive and engage the catch means,
   6. the head stop including a radially extending flange,
   7. the flange being equipped with a peripherally formed groove,
      a. and colored feathers being tied to the head stop at the said groove.

4. The invention of claim 3 wherein the recess is rearwardly formed in the flange and wherein the recess communicates with the second axial bore.

5. The invention of claim 4 wherein the weighted head terminates rearwardly in a trailing end, the said trailing end seating upon the flange when the trolling feather is assembled.

6. The invention of claim 5 wherein the trailing end of the weighted head and the said flange are of substantially similar cross-sectional configuration.

7. The invention of claim 1 wherein the flange is provided with a peripheral groove, a portion of each of the colored feathers being affixed to the head stop by tying within the said groove.

8. The invention of claim 7 and a skirt covering a portion of the colored feathers, said skirt being affixed to the head stop at the said peripheral groove.

* * * * *